United States Patent [19]

Schweitzer

[11] 4,014,308

[45] Mar. 29, 1977

[54] IGNITION SYSTEM AND APPARATUS AND METHOD FOR GENERATING TIMING SIGNALS THEREFOR

[75] Inventor: John C. Schweitzer, Grand Junction, Colo.

[73] Assignee: Delta Products, Inc., Grand Junction, Colo.

[22] Filed: Oct. 3, 1974

[21] Appl. No.: 511,580

[52] U.S. Cl. .................. 123/148 E; 123/148 CB; 331/65; 310/70 A; 315/209 CD

[51] Int. Cl.² .................. F02P 1/00; H03F 1/00; H02K 11/00

[58] Field of Search .................. 310/70, 70 A; 123/148 E, 148 CB; 331/65; 315/209 T, 209 CD

[56] References Cited

UNITED STATES PATENTS

| | | | |
|---|---|---|---|
| 3,316,448 | 4/1967 | Hardin et al. | 123/148 OC |
| 3,331,986 | 7/1967 | Hardin et al. | 123/148 OC |
| 3,395,685 | 8/1968 | Minks | 123/148 OC |
| 3,605,714 | 9/1971 | Hardin et al. | 123/148 OC |
| 3,701,041 | 10/1972 | Adler | 331/65 |
| 3,728,645 | 4/1973 | Rosen | 331/65 |
| 3,739,279 | 6/1973 | Hollis | 331/65 |
| 3,784,848 | 1/1974 | Hamilton | 331/65 |
| 3,805,185 | 4/1974 | Kishi | 331/65 |
| 3,872,398 | 3/1975 | Fausone | 331/65 |

OTHER PUBLICATIONS

Commercial Car Journal, Feb. 1974, p. 115.

*Primary Examiner*—Ronald B. Cox
*Attorney, Agent, or Firm*—Max L. Wymore

[57] ABSTRACT

A capacitive discharge type ignition system is arranged for selective operation by timing signals generated by either breaker points or a breakerless timing signal generator. The generator utilizes the signal generated by an inductive pickup to modulate an oscillator output. The modulation signal is detected and by use of a peak point detector and converted to accurate timing pulses. Circuitry is included to bias the oscillator in a linear mode and inhibit timing signal generation at turn on until the oscillator is operating stably.

16 Claims, 7 Drawing Figures

IGNITION SYSTEM AND APPARATUS AND METHOD FOR GENERATING TIMING SIGNALS THEREFOR

BACKGROUND OF THE INVENTION

The present invention relates to ignition systems of the type used with internal combustion engines, rotating turbine engines and the like. More particularly, the present invention relates to the generation of timing signals for controlling the operation of such ignition systems.

Capacitive discharge type ignition circuits are commonly used in ignition systems for automobiles. Heretofore, the operation of these ignition systems has been generally controlled by the use of mechanical breaker contacts or points to generate timing signals. The breaker contacts are opened and closed in synchronism with the movements of the pistons of an associated engine by a rotating cam in the distributor of the engine. Thereby, the discharge of a storage capacitor in the capacitive discharge type ignition circuit through the primary of an ignition coil is timed so that ignition sparks are delivered in a timed sequence to ignite combustible fuel which provides the energy to drive the engine.

A disadvantage with the use of breaker contacts or points for generating these timing signals is that they are unreliable, being subject to contact bounce, sticking and like problems associated with failure of the contacts to properly open or close.

SUMMARY OF THE INVENTION

It is an object of the present invention to provide an improved apparatus and method for generating timing signals for ignition circuits, such as capacitive discharge type ignition circuits, which eliminates the need for breaker contacts and hence their associated disadvantages.

It is also an object of the present invention to provide an improved timing apparatus as set forth which may be connected into an ignition system containing breaker points, such as a capacitive discharge type automobile ignition system, for selective alternative use so that either the improved timing apparatus or the breaker points may be used to generate ignition timing signals.

It is further an object of the present invention to provide an improved apparatus for generating ignition timing signals which uses an inductive pickup assembly.

It is additionally an object of the present invention to provide an improved ignition system having alternative sources of timing signals.

In accomplishing these and other objects, there is provided an ignition system having a timing signal generator, a capacitive discharge type ignition circuit associated with an automobile engine, breaker point mechanism and a switching arrangement for selectively connecting either the timing signal generating circuit or the breaker point mechanism to the ignition circuit. Thereby, either the timing signal generating circuit or the breaker point mechanism may be used to supply timing signals to the ignition circuit.

The timing signal generator includes an inductive pickup associated with the timing cam of the engine distributor which operates to modulate the output of an oscillator included in the generator in time sequence with engine movement. The generator operates to detect the modulation signal and generates by means of a peak point detector circuit a timing pulse therefrom accurately representative of the position of the distributor timing cam. Circuitry is also included to maintain the oscillator biased in a linear mode of operation and to inhibit generation of timing signals during initial energization of the circuit until the oscillator is stably operating.

Additional objects of the present invention reside in the apparatus and its method of operation hereinafter described in conjunction with the several drawings.

DETAILED DESCRIPTION OF THE PREFERRED EMBODIMENT

Figure 1:
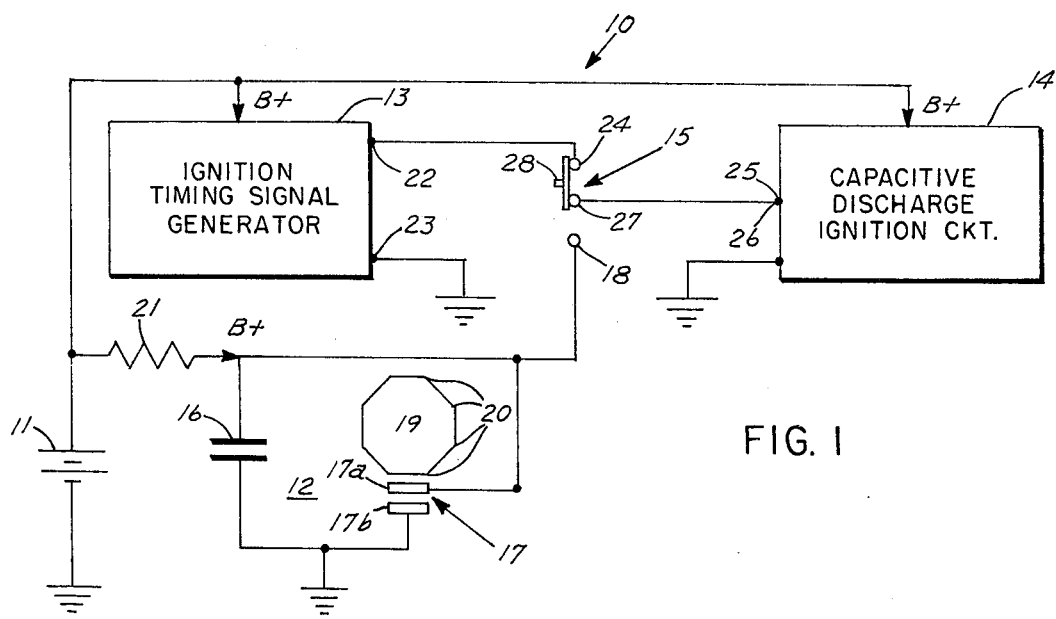
FIG. 1 is a block diagram of an ignition system according to the present invention.

Referring to the drawings in more detail, there is shown in FIG. 1, an ignition system generally identified as the numeral 10. The ignition system 10 is made of a DC power source or battery 11, breaker contact mechanism 12, an ignition timing signal generator 13, a capacitive discharge type ignition circuit 14 and a switch mechanism 15.

The breaker point mechanism 12 is of conventional construction and is made up of a points capacitor 16 connected in parallel with breaker points or contacts 17. The breaker point mechanism 12 is connected between ground and contact 18 of switch 15. The breaker contacts 17 are associated with and operated by cam 19.

The cam 19 is made of magnetic material and is mounted in the distributor of a conventional automobile internal combustion engine (not shown). Rotation of the cam 19 corresponds to the movement of the automobile engine and, as the cam 19 rotates, its edges or lobes 20 contact the breaker point 17A to close the contacts 17A, 17B. In this manner, the timing cam 19 operates to open and close the breaker points 17 to generate timing signals.

The battery 11 shown is the storage battery associated with the automobile engine. The battery 11 supplies B+ voltage, preferably twelve volts, to the points mechanism 12, the generator 13 and the ignition circuit 14. The B+ voltage is supplied to the breaker points mechanism 12 through the current limiting resistor 21 to limit the current charging the points capacitor 16 when the contacts 17 are open.

The ignition timing signal generator 13 has output terminals 22, 23 across which are generated ignition timing signals. The terminal 22 is connected to contact 24 of the switch 15 while the output terminal 23 is grounded. The generator 13 is described hereinafter in detail.

The ignition circuit 14 is of the capacitive discharge type and may be any known type of ignition circuit operable by the series of time signals generated by the conventional breaker point mechanism 12. The ignition circuit 14 is operated by applying time signals across its terminals 25 and 26. Terminal 25 is connected to the common contact 27 of the switch 15 and terminal 26 is grounded. The switch 15 has a two position movable slider contact 28 which in one position interconnects switch contacts 24, 27 and in its other position interconnects contacts 18, 27.

While it has been above indicated that the ignition circuit 14 may be of any suitable type, the circuit 14 preferably is of the type disclosed in U.S. Pat. No. 3,714,507 issued to Schweitzer et al. on Jan. 30, 1973. It is noted that the subject U.S. patent is assigned to the assignee of the present invention.

U.S. Pat. No. 3,714,507 describes a capacitor discharge ignition system operated by a breaker point mechanism like the mechanism 12 disclosed herein.

For purposes of explaining and illustrating the operation of the ignition system 10, it is hereinafter assumed that the ignition circuit 14 is the same as that described in U.S. Pat. No. 3,714,507 and the disclosure of that patent is incorporated herein by reference.

In operation of the ignition system 10, with the movable switch contact 28 switched to interconnect contacts 18 and 27, the system 10 operates to generate ignition timing signals and ignition pulses in exactly the same manner as the ignition system described in aforementioned U.S. Pat. No. 3,714,507.

Switching of the movable switch contact 28 to its other position, where contacts 24, 27 are interconnected, discloses the breaker point mechanism 12 and selectively connects in its place the ignition timing signal generator 13. As hereinafter described, the generator 13, which eliminates the breaker points 17, generates timing signals corresponding to the timing signals generated by the breaker mechanism 12. These timing signals generated by the generator 13 appear across output terminals 22, 23 and are transmitted through switch 15 to the timing input terminals 25, 26. As a consequence, the ignition circuit 14 operates in response to the timing signals of the generator 13 in the same manner as it did in response to the timing signals of the breaker point mechanism 12.

Thus, an ignition system 10 is provided which has as selected sources of timing signals the mechanism 12 and the generator 13. Consequently, if either of the sources of ignition timing signals fails, a standby source is available which may be readily switched into the ignition system.

Figure 2:
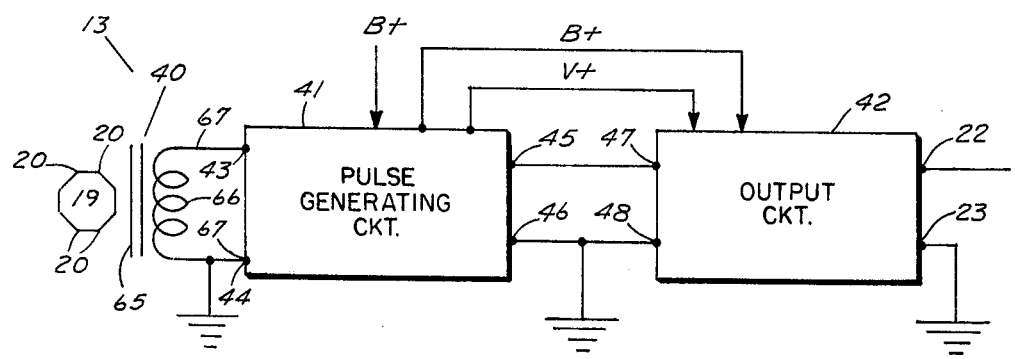
FIG. 2 is a diagram of the ignition timing signal generator of FIG. 1.
Figure 4:
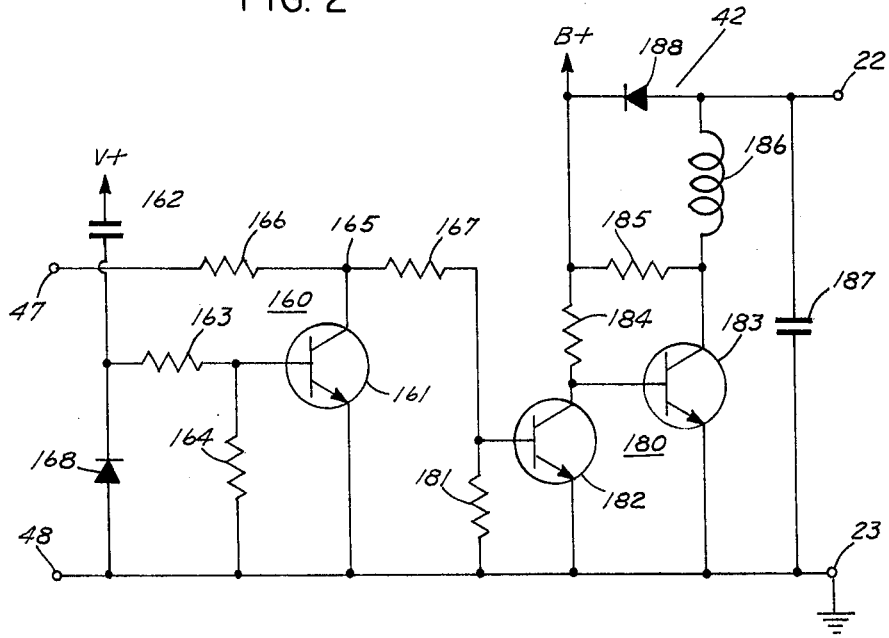
FIG. 4 is a circuit diagram of the output circuit of FIG. 2.
Figure 3:
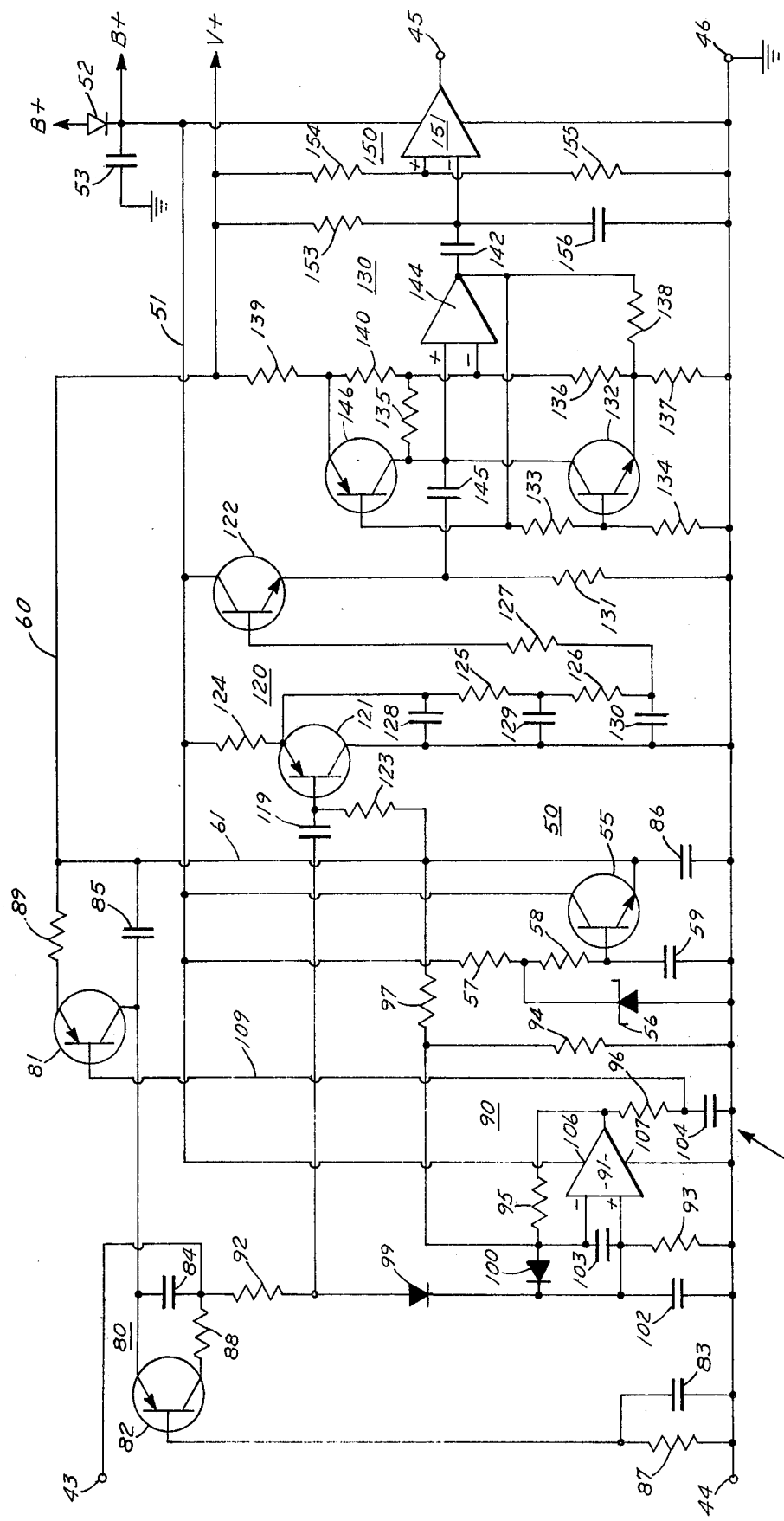
FIG. 3 is a circuit diagram of the pulse generating circuit of FIG. 2.

The ignition timing signal generator 13 is shown in more detail in FIGS. 2-4. Referring to FIG. 2, the generator 13 includes a transducer, such as an inductive pickup 40, a pulse generating circuit 41 and an output circuit 42.

The pulse generating circuit 41 has input terminals 43, 44 and output terminals 45, 46. The inductive or magnetic flux pickup 40 is connected across input terminals 43, 44 and the terminal 44 is grounded. The output terminals 45, 46 are connected to input terminals 47, 48 of the output circuit 42. Terminals 46, 48 are grounded. The output terminals of the output circuit 42 are the above discussed generator output terminals 22, 23.

As also shown in FIG. 2, the inductive pickup 40 is associated with the aforementioned distributor timing cam 19 and is mounted in close proximity thereto so that a magnetic flux loss occurs that varies as the cam lobes or edges 20 approach the pickup 40. Further shown in FIG. 2 is the supply of B+ and V+ DC voltages to the output circuit 42. The B+ voltage, which is preferably plus twelve volts, is supplied by the battery 11 to the circuit 41 and transmitted therefrom to the circuit 42. The V+ voltage is preferably plus 6 volts and is generated in the pulse generating circuit 41 by a low voltage regulator circuit 50, shown in FIG. 3.

FIG. 3 is a circuit diagram of the pulse generating circuit 41. Referring thereto, B+ voltage is supplied to the voltage bus 51 through diode 52 and AC bypass capacitor 53 is connected between the voltage bus 51 and ground.

Connected between the B+ voltage bus 51 and ground is the low voltage regulator circuit 50. This circuit 50 is conventional in construction and is made up of NPN transistor 55, zener diode 56, resistors 57 and 58 and capacitor 59. The voltage regulator 50 operates in a conventional manner to generate from the B+ voltage on bus 51 the V+ on bus 60. The V+ voltage, which is an accurately stabilized voltage, is generated on the emitter electrode of the transistor 55 and transmitted to the bus 60 on the lead 61.

Figure 7:
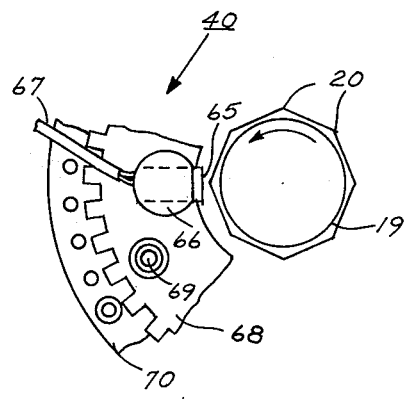

Before continuing with the description of the pulse generator circuit 41, reference is made to FIG. 7 which shows the mounting of the magnetic pickup assembly 40 in close proximate to the distributor cam 19. As there shown, the pickup assembly 40 is made of a core 65 surrounded by an inductive sleeve 66. Connected to the inductive sleeve 66 are leads 67 which are shown in FIG. 2 connected to the pulse generating circuit input terminals 43, 44.

The pickup assembly 40 is shown in FIG. 7 mounted in close proximity to the distributor timing cam 19 by an adjustable mounting plate or bracket 68. The plate 68 is secured by clamping screw 69 to fixed portion 70 of the engine distributor. The direction of rotation of cam 19 is indicated by an arrow.

It is noted that by adjusting the plate 68 with a timing light connected in a conventional manner to the automobile engine (not shown) that the proper positioning of the pickup 40 may be established. Further, with the timing light connected, the switch 15 may be operated to check to see if the positioning of the pickup 40 corresponds to the positioning of the breaker points 17. It is noted to optimize breaker point life when the points are not being used to generate timing signals that it is desirable to block the points 17 open with a soft piece of electrically nonconductive material.

Referring again to FIG. 3, an oscillator circuit 80 is included in the circuit 41. The oscillator 80 is of the Colpitts type and preferably oscillates at a base frequency of approximately 500 KHz.

The oscillator 80 includes PNP transistors 81, 82; capacitors 83, 84, 85, 86; resistors 87, 88, 89; and inductive pickup 40 which is shown in FIG. 2 connected between terminals 43, 44.

Associated with the oscillator 80 is a control circuit 90 for maintaining the oscillator 80 biased in a linear mode. The control circuit 90 is made up of an operational amplifier 91; resistors 92-97; diodes 99-100; and capacitors 102-104. In the control circuit 90, the operational amplifier 91 receives B+ and ground bias voltages on terminals 106, 107, respectively; and has V+ bias voltage applied to negative input terminal by the voltage divider circuit made up of resistors 97, 94.

In operation of the control circuit 90 and oscillator 80, the AC signal generated by the rotation of the magnetic timing cam 19 in close proximity of the inductive pickup 40 is coupled through surge resistor 92 and is rectified and filtered by the diode 99, capacitor 102 combination. The decay time constant of this filter arrangement is controlled by the relative values of the capacitor 102 and resistor 93. Resistors 97, 94 function as a voltage divider and set the reference or control point of the amplifier 91. The diode 100 functions to initially apply a bias voltage to the plus terminal of the amplifier 91 to bias the amplifier into a conductive state. The resistor 95 operates to provide negative feedback between the output and negative input of the amplifier 91 and also establishes proper gain for stable operation of the operational amplifier 91. The series connected resistor 96 and capacitor 104 operate as a filter to remove any noise or oscillations from the output signal of the amplifier 91.

Figure 5:
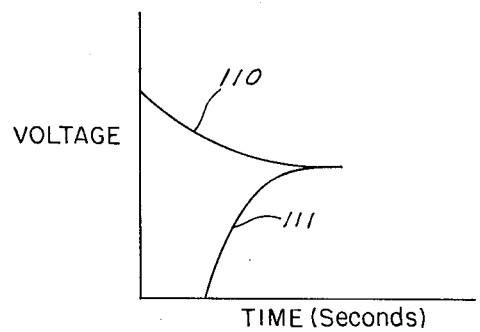
FIGS. 5 and 6 are graphs of typical voltage signals generated in the pulse generating circuit of FIG. 3; and, FIG. 7 is a partial plan view of the inductive pickup assembly of FIG. 2 shown mounted in situ in an engine distributor.

The filtered output of the amplifier 91 is the control voltage applied on lead 109 to the base electrode of the control transistor 81 of the oscillator 80. It is this control voltage which maintains the oscillator 80 in a linear mode of operation. Referring to FIG. 5, voltage curve 110 indicates the control voltage generated on the output of the amplifier 91 from the time zero when the circuit 41 is first energized. Voltage curve 111 indicates the oscillator reference voltage generated on the collector of the control transistor 81. It is noted that the oscillator reference signal 111 rapidly stabilizes at the level of the control voltage 110, i.e., in less than 1 second. The oscillator control transistor 81, in addition to having its base electrode biased by the control voltage 110, has V+ bias voltage applied to its emitter electrode through resistor 89.

In the oscillator 80, the transistor 82 operates as the active element which provides the gain necessary to sustain oscillations therein while the transistor 81 operates as a variable resistor which controls oscillator level to maintain operation in the linear mode. The capacitors 84, 85 operate as a capacitive voltage divider which provides positive feedback to start and sustain oscillations. The resistor 89 operates as a minimum control resistance to prevent oscillator instability while the resistor 88 prevents overdriving or damage to the oscillator transistor 82 which could be caused by any radio frequency noise. The parallel connected resistor 87 and capacitor 83 provide a bypass circuit for the base electrode of the transistor 82 and generates a turn on bias for the transistor 82. The capacitor 86 operates as a supply voltage bypass and also provides a portion of the oscillator tank circuit.

The tank circuit of the oscillator 80 is formed by the inductive pickup 40, connected between terminal 43 and ground, and the capacitors 84–86. The oscillator 80 generates oscillations in its tank circuit at a carrier frequency of approximately 500 KHz and this carrier signal is amplitude modulated by the varying flux loss experienced by the inductive pickup 40 as a result of the rotation of the distributor cam 19. The amplitude of this modulated carrier output signal thus corresponds to the rotation of the distributor cam 19, and hence, corresponds to the movements of the associated engine. The amplitude modulated oscillator output is generated on the emitter electrode of the transistor 82 and applied through capacitor 84, resistor 92 and capacitor 119 to a detector filter circuit 120.

The detector filter 120 is made up of DC blocking capacitor 119, PNP transistor 121, NPN transistor 122, bias resistors 123–124, filter resistors 125–127, filter capacitors 128–130 and load resistor 131. In operation of the detector 120, the transistor 121 is driven sufficiently by the oscillator output and provides base circuit rectification. The rectified signal from the transistor 121 is filtered by the filter circuit made up of resistors 125–127 and capacitors 128–130. Thereby, the amplitude modulation is removed or detected from the oscillator carrier signal. This amplitude modulation signal which represents distributor cam movement is amplified by the emitter follower circuit provided by the transistor 122 and load resistor 131 to reduce output impedance and is applied to the positive input of operational amplifier 144 through capacitor 145.

Operational amplifier 144 forms part of a peak point detector circuit 130. The circuit 130 includes, in addition to the capacitor 145 and operational amplifier 144, PNP transistor 146, NPN transistor 132, resistors 133–140 and capacitor 142.

The peak point detector 130 operates to convert the amplitude modulation signal into an output signal which accurately represents the closest points of approach of the distributor cam lobes 20 to the pickup 40.

As shown in FIG. 3, the peak point detector 130 basically is formed by the operational amplifier 144 and the clamping transistors 146 and 132. The bias string formed by the resistors 136, 137, 139, 140 establishes the operating potentials for the operational amplifier 144 and the clamping transistors 146, 132.

In operation of the peak detector circuit 130, a positive going input signal applied thereto generates a positive output signal on the output of the amplifier 144 by biasing into conduction transistor 132 to discharge capacitor 145 at a rate precisely determined by and proportional to the rate of rise of the amplitude modulation input signal. If the amplitude modulation input signal reverses its direction, the amplifier 144 immediately follows reversing its output with the transistor 146 being biased into conduction to charge the capacitor 145 at a rate precisely determined by and proportional to the rate of fall of the amplitude modulation input signal. These changes in output of the amplifier 144 generates an output signal accurately corresponding in time coincidence to the closest points of approach of the lobes 20 of the rotating distributor cam 19 to the pickup 40.

Figure 6:
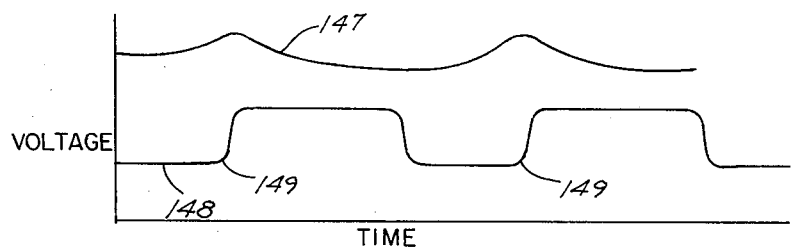

Referring to FIG. 6, the voltage waveform 147 there shown is a graphical representation of a typical amplitude modulation signal produced by the action of the pickup assembly 40 which is applied to the input of the amplifier 144. Voltage waveform 148 is a graphical representation of the output signal generated by the peak detector 130 on the output of amplifier 144 in response to the input signal 147. It is noted that the output signal 148 is substantially a square wave and that the changes in direction 149 of the output signal 148 are distinct to provide accurate indications of the closest points of approach of the distributor cam lobes 20 to the pickup 40.

It is noted that the output 148 of the amplifier 144 has a finite rise and fall time, which is dependent on the shape of the input waveform 147 and the RPM (revolutions per minute) of the distributor cam 19. This finite rise and fall time produces a small phase shift between the time of closest approach of the cam lobes 20 and the generation of the corresponding output signal 148 representative thereof. The phase shift, however, remains constant over the full operating range of the generator 13 and, thus, does not introduce any timing error.

The output of the amplifier 144 drives a pulse generator 150 through the capacitor 142. The pulse generator 150 includes operational amplifier 151, resistors 153-155, capacitor 156, and the aforementioned capacitor 142.

The pulse generator 150 operates to produce from the output of the amplifier 144 output or trigger pulses which are of uniform duration irrespective of the rotation rate of the distributor cam 19. The pulse generator 150 is the combination of an RC differentiation circuit with a high gain clipper amplifier. In operation of the generator 150, the capacitor 142 and the resistor 153 differentiate the output signal 148 and the capacitor 156 filters the differentiated signal to remove any high frequency transients therefrom. The operating point of the amplifier 150 is set by the resistors 154, 155 to only respond to negative going input signals. Thereby, the amplifier 150 generates an output terminal 45 a positive going pulse of approximately two milliseconds duration to indicate the times of closest approach of the cam lobes 20 to the pickup 40.

Referring now to FIG. 4, the output circuit 42 is there shown. The circuit 42 includes turn on clamp circuitry 160 and power gain circuitry 180.

The turn on clamp circuitry 160 operates to prevent delivery of timing signals, and thus firing of the ignition circuit 10, during turn on and stabilization of the oscillator 80. Upon energization of the system 10 and application of B+ voltage thereto, a positive voltage pulse is generated on the base electrode of NPN transistor 161 by the action of the capacitor 162 and resistor 163. The positive voltage appears across resistor 164 and operates to bias the collector-emitter path of the transistor 161 into conduction, thereby grounding the junction 165 between resistors 166, 167. This voltage clamp on the junction 165 remains for approximately one-half second, the time necessary to charge the capacitor 162. Once the capacitor 162 is charged, the emitter-collector path of the transistor 161 is biased into a nonconductive state. Diode 168 operates as a recovery diode to reset the capacitor 162 to zero charge whenever power is turned off. Approximately 3 seconds are necessary to discharge the capacitor 162 to zero charge.

With the junction point 165 clamped to ground, the output of the pulse generator 150 is not transmitted to the power gain circuitry 180. Removal of the voltage clamp from the junction 165 causes the pulse generator output received on terminal 47 to be transmitted through resistors 166 and 167 to generate a corresponding voltage on resistor 181.

The output gain circuit 180 is made up of the resistor 181, NPN transistors 182-183, resistors 184-185, inductor 186, capacitor 187 and diode 188. The output stages provided by the transistors 182-183 and resistors 184-185 provide the necessary power gain for the output pulses of the pulse generator 150 to produce timing signals of sufficient power to drive the capacitive discharge ignition circuit 14, shown in FIG. 1. In the output gain circuitry 180, the diode 188 operates to prevent damage to the transistor 183 in case the slide switch 28 and a related switch in the ignition circuit 19 (not shown) are incorrectly positioned. The inductor 186 and capacitor 187 operate as a filter network to eliminate any RF, i.e., radio frequency, signals coupled from the ignition circuit 14.

Thus, a breakerless ignition timing signal generator has been provided for driving the ignition circuit 14. It is noted that an exemplary timing signal generator constructed like the type 13 described herein had a physical size of approximately 3¾ inches by 1¾ inches by 3 inches, had its case made of anodized aluminum, operated on DC operating voltages in the range of 8 to 18 volts, operated at temperatures in the range of −35° F. to 250° F., had a timing accuracy of one angular degree over its full range of operating voltages and temperatures, and was usable to generate timing signals with a distributor cam rotation rate in the range of approximately 20 revolutions per minutes (RPM) up to in excess of seven thousand RPM.

It is further noted that the ignition timing signal generator 13 and the pickup assembly 40 may be readily installed in an automobile and its distributor without disturbing the mounting of the conventional breaker points 17 and points capacitor 16 therein.

While there has been described what is considered to be the preferred embodiment of the present invention, it will be obvious to those skilled in the art that various changes and modifications may be made therein without departing from the spirit and scope of the present invention.

What is claimed is:

1. Apparatus for generating timing signals for an engine ignition circuit or the like comprising:
    inductive pickup means for generating an electrical signal corresponding to the movements of an engine or the like;
    oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;
    means for controlling the operation of said oscillator means operable to bias said oscillator means in a linear mode of operation; and
    means responsive to said modulated output signal for generating a series of uniform timing pulses corresponding to the movements of an engine with which said apparatus is associated to actuate an ignition circuit associated therewith, including means for inhibiting the outputting of said uniform timing pulses for a selected period of time following energization of said apparatus, said selected period of time corresponding in length to the time period necessary for the operation of said oscillator means to stabilize after energization.

2. Apparatus for generating timing signals for an engine ignition circuit or the like comprising:
    inductive pickup means for generating an electrical signal corresponding to the movements of an engine or the like;
    oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith wherein said means for generating a series of uniform timing pulses comprises:

means for detecting the modulation component of said modulated output signal; and, means for generating uniform timing pulses representative of the peak points of said modulation component, including means for power amplifying said uniform timing pulses and including means for inhibiting the outputting of said uniform timing pulses for a selected period of time following energization of said apparatus, said selected period of time corresponding in length to the time period necessary for the operation of said oscillator means to stabilize after energization, said inhibiting means comprising a voltage clamping circuit operable to clamp a selected voltage on the input of said power amplifying means for said selected period of time.

3. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith wherein said means for generating a series of uniform timing pulses comprises:

means for detecting the modulation component of said modulated output signal; and, means for generating uniform timing pulses representative of the peak points of said modulation component, including means for power amplifying said uniform timing pulses and including means for inhibiting the outputting of said uniform timing pulses for a selected period of time following energization of said apparatus, said selected period of time corresponding in length to the time period necessary for the operation of said oscillator means to stabilize after energization, said inhibiting means comprising a voltage clamping circuit operable to clamp a selected voltage on the input of said power amplifying means for said selected period of time wherein said voltage clamping circuit includes an RC timing circuit which determines said selected period of time.

4. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith in combination with an engine ignition circuit, said engine ignition circuit being connected to receive said uniform timing pulses and including a distributor having a magnetic timing cam with lobes thereon which rotates in time correspondence to engine movement; and wherein said inductive pickup means is mounted adjacent said timing cam to detect the closest points of approach of said cam lobes and generate an electrical signal in time correspondence therewith wherein:

said inductive pickup means forms a part of said oscillator means; and, said oscillator means is operable to generate a carrier signal of a selected reference frequency, said carrier signal being modulated by said electrical signal generated by said inductive pickup means wherein said means for generating a series of uniform timing pulses comprises:

means for detecting the modulation component of said modulated output signal; and, means for generating uniform timing pulses representative of the peak points of said modulation component, said peak points corresponding to the closest points of approach of said cam lobes to said pickup means wherein said means for generating uniform timing pulses comprises:

means for converting said modulation component into a wave which alternately changes in positive and negative going directional senses between first and second signal levels to substantially define a square wave; and, means responsive only to changes in a preselected one of said directional senses between the first and second signal levels of said square wave for generating said uniform timing pulses, including:

means for power amplifying said uniform timing pulses; and, means for inhibiting the outputting of said uniform timing pulses for a selected period of time following energization of said apparatus, said selected period of time corresponding in length to the time period necessary for the operation of said oscillator means to stabilize after energization.

5. Apparatus for generating timing signals for an engine ignition circuit or the like comprising:
inductive pickup means for generating an electrical signal corresponding to the movements of an engine or the like;
oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;
means for controlling the operation of said oscillator means operable to bias said oscillator means in a linear mode of operation; and
means responsive to said modulated output signal for generating a series of uniform timing pulses corresponding to the movements of an engine with which said apparatus is associated to actuate an ignition circuit associated therewith wherein:
said means for controlling the operation of said oscillator means includes circuit means coupled to receive said first electrical signal from said pickup means and operable in response thereto to generate a control signal effective to bias said oscillator means in a linear mode of operation; and,
said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation wherein:
said oscillator means is of the Colpitts type and is DC biased; and,
said first and second transistor means each comprises a transistor, the emitter-collector current paths of said transistors being connected in series with the DC bias of said oscillator means, the base electrode of said transistor comprising said second transistor means being connected to receive said control signal and its emitter-collector current path operating as a variable bias resistor the resistance characteristic of which is controlled by the magnitude of said control signal.

6. Apparatus for generating timing signals for an engine ignition circuit or the like comprising:
inductive pickup means for generating an electrical signal corresponding to the movements of an engine or the like;
oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;
means for controlling the operation of said oscillator means operable to bias said oscillator means in a linear mode of operation; and
means responsive to said modulated output signal for generating a series of uniform timing pulses corresponding to the movements of an engine with which said apparatus is associated to actuate an ignition circuit associated therewith wherein:
said means for controlling the operation of said oscillator means includes circuit means coupled to receive said first electrical signal from said pickup means and operable in response thereto to generate a control signal effective to bias said oscillator means in a linear mode of operation; and,
said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation wherein:
said oscillator means is of the Colpitts type and is DC biased; and,
said first and second transistor means each comprises a transistor, the emitter-collector current paths of said transistors being connected in series with the DC bias of said oscillator means, the base electrode of said transistor comprising said second transistor means being connected to receive said control signal and its emitter-collector current path operating as a variable bias resistor the resistance characteristic of which is controlled by the magnitude of said control signal, including means for generating a stable DC bias voltage of predetermined magnitude, said bias voltage generating means being connected to supply said DC bias voltage to said oscillator means.

7. Apparatus for generating timing signals for an engine ignition circuit or the like comprising:
inductive pickup means for generating an electrical signal corresponding to the movements of an engine or the like;
oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;
means for controlling the operation of said oscillator means operable to bias said oscillator means in a linear mode of operation; and
means responsive to said modulated output signal for generating a series of uniform timing pulses corresponding to the movements of an engine with which said apparatus is associated to actuate an ignition circuit associated therewith wherein:

said means for controlling the operation of said oscillator means includes circuit means coupled to receive said first electrical signal from said pickup means and operable in response thereto to generate a control signal effective to bias said oscillator means in a linear mode of operation; and, said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation wherein said circuit means operable to generate said control signal includes operational amplifier means, wherein said circuit means includes means for filtering noise from said control signal wherein:

said oscillator means is of the Colpitts type and is DC biased;

said circuit means operable to generate said control signal is DC biased;

said first and second transistor means each comprises a transistor, the emitter-collector current paths of said transistors being connected in series with the DC bias of said oscillator means, the base electrode of said transistor comprising said second transistor means being connected to receive said control signal and its emitter-collector current path operating as a variable bias resistor the resistance characteristic of which is controlled by the magnitude of said control signal; and including:

means for generating a stable DC bias voltage of predetermined magnitude, said bias voltage generating means being connected to supply said DC voltage to said oscillator means and said circuit means.

8. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith wherein:

said means for controlling the operation of said oscillator means includes circuit means coupled to receive said first electrical signal from said pickup means and operable in response thereto to generate a control signal effective to bias said oscillator means in a linear mode of operation; and, said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation including means for inhibiting the outputting of said uniform timing pulses for a selected period of time following the energization of said apparatus, said selected period of time corresponding in length to the time period necessary for the operation of said oscillator means to stabilize after energization.

9. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith wherein:

said means for controlling the operation of said oscillator means includes circuit means coupled to receive said first electrical signal from said pickup means and operable in response thereto to generate a control signal effective to bias said oscillator means in a linear mode of operation; and, said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation including means for inhibiting the outputting of said uniform timing pulses for a selected period of time following the energization of said apparatus, said selected period of time corresponding in length to the time period necessary for the operation of said oscillator means to stabilize after energization wherein:

said apparatus includes circuitry for receiving and outputting said uniform timing pulses to an engine ignition circuit or the like; and, said inhibiting means comprises a voltage clamping circuit operable to clamp a selected voltage on the input of said outputting circuitry for said selected period of time.

10. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith wherein:

said means for controlling the operation of said oscillator means includes circuit means coupled to receive said first electrical signal from said pickup means and operable in response thereto to generate a control signal effective to bias said oscillator means in a linear mode of operation; and, said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation including means for inhibiting the outputting of said uniform timing pulses for a selected period of time following the energization of said apparatus, said selected period of time corresponding in length to the time period necessary for the operation of said oscillator means to stabilize after energization wherein:

said apparatus includes circuitry for receiving and outputting said uniform timing pulses to an engine ignition circuit or the like; and, said inhibiting means comprises a voltage clamping circuit operable to clamp a selected voltage on the input of said outputting circuitry for said selected period of time wherein said voltage clamping circuit includes an RC timing circuit which determines said selected period of time.

11. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith wherein:

said means for controlling the operation of said oscillator means includes circuit means coupled to receive said first electrical signal from said pickup means and operable in response thereto to generate a control signal effective to bias said oscillator means in a linear mode of operation; and, said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation including means for inhibiting the outputting of said uniform timing pulses for a selected period of time following the energization of said apparatus, said selected period of time corresponding in length to the time period necessary for the operation of said oscillator means to stabilize after energization in combination with an engine ignition circuit, said engine ignition circuit being a capacitive discharge type ignition circuit; and, including:

breaker point contact means for generating timing signals to actuate said ignition circuit; and, switch means for selectively connecting said ignition circuit with either said apparatus for generating timing signals or said breaker point contact means.

12. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith in combination with an engine ignition circuit, said engine ignition circuit being connected to receive said uniform timing pulses and including a distributor having a magnetic timing cam with lobes thereon which rotates in time correspondence to engine movement; and wherein said inductive pickup means is mounted adjacent said timing cam to detect the closest points of approach of said cam lobes and generate an electrical signal in time correspondence therewith wherein:

said inductive pickup means forms a part of said oscillator means; and, said oscillator means is operable to generate a carrier signal of a selected reference frequency, said carrier signal being modulated by said electrical signal generated by said inductive pickup means wherein said means for generating a series of uniform timing pulses comprises:

means for detecting the modulation component of said modulated output signal; and, means for generating uniform timing pulses representative of the peak points of said modulation component, said peak points corresponding to the closest points of approach of said cam lobes to said pickup means wherein said means for generating uniform timing pulses comprises:

means for converting said modulation component into a wave which alternately changes in positive and negative going directional senses between first and second signal levels to substantially define a square wave; and, means responsive only to changes in a preselected one of said directional senses between the first and second signal levels of said square wave for generating said uniform timing pulses including:

means for power amplifying said uniform timing pulses; and, means for inhibiting the outputting of said uniform timing pulses for a selected period of time following energization of said apparatus, said selected period of time corresponding in length to the time period necessary for the operation of said oscillator means to stabilize after energization wherein said inhibiting means comprises a voltage clamping circuit operable to clamp a selected voltage on the input of said power amplifying means for said selected period of time.

13. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means for controlling the operation of said oscillator means operable to bias said oscillator means in a linear mode of operation; and means responsive to said modulated output signal for generating a series of uniform timing pulses corresponding to the movements of an engine with which said apparatus is associated to actuate an ignition circuit associated therewith in combination with an engine ignition circuit, said engine ignition circuit being connected to receive said uniform timing pulses and including a distributor having a magnetic timing cam with lobes thereon which rotates in time correspondence to engine movement; and wherein said inductive pickup means is mounted adjacent said timing cam to detect the closest points of approach of said cam lobes and generate an electrical signal in time correspondence therewith wherein:

said inductive pickup means forms a part of said oscillator means; and, said oscillator means is operable to generate a carrier signal of a selected reference frequency, said carrier signal being modulated by said electrical signal generated by said inductive pickup means wherein said means for generating a series of uniform timing pulses comprises:

means for detecting the modulation component of said modulated output signal; and, means for generating uniform timing pulses representative of the peak points of said modulation component, said peak points corresponding to the closest points of approach of said cam lobes to said pickup means wherein said means for generating uniform timing pulses comprises:

means for converting said modulation component into a wave which alternately changes in positive and negative going directional senses between first and second signal levels to substantially define a square wave; and, means responsive only to changes in a preselected one of said directional senses between the first and second signal levels of said square wave for generating said uniform timing pulses including:

means for power amplifying said uniform timing pulses; and, means for inhibiting the outputting of said uniform timing pulses for a selected period of time following energization of said apparatus, said selected period of time corresponding in length to the time period necessary for the operation of said oscillator means to stabilize after energization wherein said inhibiting means comprises a voltage clamping circuit operable to clamp a selected voltage on the input of said power amplifying means for said selected period of time wherein said voltage clamping circuit includes an RC timing circuit which determines said selected period of time.

14. Apparatus for generating timing signals for an engine ignition circuit or the like comprising:

inductive pickup means for generating an electrical signal corresponding to the movements of an engine or the like;

oscillator means operable to generate a carrier signal of a selected reference frequency and responsive to said electrical signal for producing an amplitude modulated output signal representative of the movements of an engine with which said apparatus is associated, said amplitude modulated output signal being said carrier signal amplitude modulated by said electrical signal, said oscillator means having an inductive-capacitive resonance circuit, said pickup means forming at least a part of the inductive portion of said resonance circuit;

means controlling the operation of said oscillator means to bias said oscillator means in a linear mode of operation; and means responsive to said modulated output signal for generating a series of uniform timing pulses corresponding to the movements of an engine with which said apparatus is associated to actuate an ignition circuit associated therewith;

wherein said means for generating a series of uniform timing pulses comprises:

means for detecting the modulation component of said modulated output signal; and, means for generating uniform timing pulses representative of the peak points of said modulation component;

wherein said means for generating uniform timing pulses comprises:

means for converting said modulation component into a wave which alternately changes in positive and negative going directional senses between first and second signal levels to substantially define a square wave; and, means responsive to said square wave for generating therefrom said uniform timing pulses;

wherein said means responsive to said square wave is responsive only to changes in a predetermined one of said directional senses between the first and second signal levels of said square wave for generating said uniform timing pulses;

wherein said means for controlling the operation of said oscillator means includes circuit means coupled to receive said first electrical signal from said pickup means and operable in response thereto to generate a control signal effective to bias said oscillator means in a linear mode of operation; and said oscillator means includes first and second transistor means, said first transistor means being connected as an active element and operable to provide the gain necessary to sustain oscillations and generate said carrier signal, said second transistor means being responsive to said control signal and connected as a bias control element to control the gain of said first transistor means as a function of said control signal to bias said oscillator means in a linear mode of operation; including means for inhibiting the outputting of said uniform timing pulses for a selected period of time following the energization of said apparatus, said selected period of time corresponding in length to the time period necessary for the operation of said oscillator means to stabilize after energization.

15. Apparatus for generating timing signals for an engine ignition circuit or the like comprising:

inductive pickup means for generating an electrical signal corresponding to the movements of an engine or the like;

oscillator means responsive to said electrical signal for producing a modulated output signal representative of the movements of an engine with which said apparatus is associated, said oscillator means having an inductive-capacitive resonance circuit, said pickup means forming at least a part of the inductive portion of said resonance circuit;

means responsive to said modulated output signal for generating a series of uniform timing pulses corresponding to the movements of an engine with which said apparatus is associated to actuate an ignition circuit associated therewith; and, means for inhibiting the outputting of said uniform timing pulses for a selected period of time following the energization of said apparatus, said selected period of time corresponding in length to the time period necessary for the operation of said oscillator means to stabilize after energization wherein:

said apparatus includes circuitry for receiving and outputting said uniform timing pulses to an engine ignition circuit or the like; and, said inhibiting means comprises a voltage clamping circuit operable to clamp a selected voltage on the input of said outputting circuitry for said selected period of time.

16. Apparatus for generating timing signals for an engine ignition circuit or the like comprising:

inductive pickup means for generating an electrical signal corresponding to the movements of an engine or the like;

oscillator means responsive to said electrical signal for producing a modulated output signal representative of the movements of an engine with which said apparatus is associated, said oscillator means having an inductive-capacitive resonance circuit, said pickup means forming at least a part of the inductive portion of said resonance circuit;

means responsive to said modulated output signal for generating a series of uniform timing pulses corresponding to the movements of an engine with which said apparatus is associated to actuate an ignition circuit associated therewith; and, means for inhibiting the outputting of said uniform timing pulses for a selected period of time following the energization of said apparatus, said selected period of time corresponding in length to the time period necessary for the operation of said oscillator means to stabilize after energization wherein:

said apparatus includes circuitry for receiving and outputting said uniform timing pulses to an engine ignition circuit or the like; and, said inhibiting means comprises a voltage clamping circuit operable to clamp a selected voltage on the input of said outputting circuitry for said selected period of time wherein said voltage clamping circuit includes an RC timing circuit which determines said selected period of time.

* * * * *